United States Patent
Ise

[11] Patent Number: 6,082,210
[45] Date of Patent: Jul. 4, 2000

[54] BALL CONNECTING BODY AND BALL SCREW APPARATUS USING THE SAME

[75] Inventor: Genjiro Ise, Tokyo, Japan

[73] Assignee: THK Co., Ltd., Tokyo, Japan

[21] Appl. No.: 09/114,965

[22] Filed: Jul. 14, 1998

[30] Foreign Application Priority Data

Jul. 18, 1997 [JP] Japan ..................................... 9-194458

[51] Int. Cl.⁷ ............................. F16H 55/17; F16C 29/06
[52] U.S. Cl. ...................... 74/459; 74/89.15; 74/424.8 R; 384/45; 384/49; 384/51
[58] Field of Search ........................... 74/89.15, 424.8 R, 74/459; 384/43, 44, 49, 45, 51

[56] References Cited

U.S. PATENT DOCUMENTS

| | | | |
|---|---|---|---|
| 4,841,796 | 6/1989 | Teramachi | 74/459 |
| 5,156,462 | 10/1992 | Jacob et al. | 384/49 |
| 5,295,407 | 3/1994 | Hirose et al. | 74/459 |
| 5,622,082 | 4/1997 | Machelski | 74/459 |
| 5,755,516 | 5/1998 | Teramachi et al. | 384/45 |

FOREIGN PATENT DOCUMENTS

| | | |
|---|---|---|
| 52217 | 3/1993 | Japan . |
| 5-27408 | 4/1993 | Japan . |
| 89360 | 4/1998 | Japan . |

*Primary Examiner*—David A. Bucci
*Assistant Examiner*—Marcus Charles
*Attorney, Agent, or Firm*—Arent Fox Kintner Plotkin & Kahn, PLLC

[57] ABSTRACT

A ball connecting body in which a multiplicity of balls are arranged in a line at a predetermined interval and in a freely rotating manner. The ball connecting body is installed and used in a ball endless track of a ball screw apparatus in which a screw shaft and a nut member are meshed with each other through a multiplicity of balls. The ball connecting body is constituted by a multiplicity of balls circulating on a substantially circular ring-like ball endless track provided in a bearing apparatus, and a flexible connecting body belt arranging the balls in a line at a predetermined interval and holding each of the balls in a freely rotating manner. Further, the connecting body belt is constituted by a plurality of spacer portions inserted between the mutually adjacent balls and having a spherical seat for bringing the balls into contact therewith formed, and a flange-like connecting band portion mutually connecting the spacer portions so as to outwardly surround the spacer portions, and is formed in a substantially circular ring shape at a time of arranging the balls.

3 Claims, 7 Drawing Sheets

BALL CONNECTING BODY AND BALL SCREW APPARATUS USING THE SAME

TECHNICAL FIELD

The present invention relates to a ball connecting body in which a multiplicity of balls are arranged in a line at a predetermined interval and in a freely rotating manner, and more particularly to a ball connecting body installed and used in a ball endless track of a ball screw apparatus in which a screw shaft and a nut member are meshed with each other through a multiplicity of balls and a ball screw apparatus using the same.

BACKGROUND OF THE INVENTION

A ball screw apparatus is frequently used in a straight sliding portion of an industrial robot, and is mainly used for a purpose of giving a straight moving amount in accordance with a rotating amount of a motor to a movable body such as a table. Such a ball screw apparatus is generally constituted by a screw shaft having a spiral ball rolling groove formed on an outer peripheral surface, and a nut member meshed with the screw shaft through a multiplicity of balls and provided with an endless track on which the balls circulate, and is structured such that when the screw shaft is connected to the motor and is rotated, a multiplicity of balls interposed between the screw shaft and the nut member circulate within the endless track provided in the nut member, and the nut member lightly performs a straight movement in an axial direction of the screw shaft in order to this.

On the contrary, in this kind of ball screw apparatus, each of the balls circulating within the ball endless track is mutually brought into contact with the balls positioned in front of and at the rear of the ball, whereby there are disadvantages such that the ball is prevented from smoothly circulating and a contact noise between the balls is rasping at a high rotation of the screw shaft, and as a structure for solving the disadvantages, a ball screw apparatus disclosed in Japanese Unexamined Utility Model Publication No. 5-27408 is suggested.

In the ball screw apparatus disclosed in the publication, a band-like retainer having a flexibility is provided within a ball endless track of a nut member in such a manner as to be capable of circulating and moving, and a ball pocket for receiving a ball is arranged in such a band-like retainer at a predetermined interval. Accordingly, the balls are received in the ball endless track of the nut member in a state of being arranged in the band-like retainer at a predetermined interval, whereby in the ball screw apparatus, the balls circulating within the endless track are prevented from being mutually brought into contact with each other.

In this case, as a structure of forming the ball endless track in the nut member of the ball screw apparatus, as shown in Japanese Unexamined Utility Model Publication No. 5-27408 mentioned above, a structure in which a ball circulating pipe for jumping over some winds of ball rolling grooves in the screw shaft is provided and a ball endless track is constructed with including some winds of ball rolling grooves, and as shown in FIG. 11, a deflector 103 for scooping up a ball 102 from a ball rolling groove 101 in the screw shaft 100 is fitted to an inner peripheral surface of a nut member 104 and the ball 102 rolling on the ball rolling groove 101 of the screw shaft 100 is returned only for a wind of the ball rolling groove 101 through the deflector 103 have been known.

In the former structure using the ball circulating pipe, since the pipe is formed to have a length such as to jump over some winds of ball rolling grooves and is relatively gently curved, even when the band-like retainer mentioned above is assembled in the ball endless track and circulated, the band-like retainer can be smoothly inserted to the ball circulating pipe by curbing the band-like retainer after bending it within the pipe in a proper direction.

However, in the structure using the latter deflector, although the ball endless track is formed in a substantially circular ring shape corresponding to a wind of the ball rolling groove, the ball rolling in an inner portion of the deflector suddenly displaces in an axial direction of the screw shaft only for a lead of the ball rolling groove, so that in the case of assembling the band-like retainer of Japanese Unexamined Utility Model Publication No. 5-27408 formed in a band plate shape in the ball endless track as it is, the band-like retainer is forcibly curbed in the inner portion of the deflector. Accordingly, there is a risk that the band-like retainer can not smoothly circulate in the inner portion of the ball endless track.

DISCLOSURE OF THE INVENTION

The present invention is made by taking the problems mentioned above into consideration, and an object of the invention is to provide a ball connecting body applicable to a ball screw apparatus in which a screw shaft and a nut member are meshed with each other through a multiplicity of balls, and a substantially circular ring-like ball endless track is constructed by using a deflector, and capable of smoothly circulating within the ball endless track.

Further, another object of the invention is to provide a ball screw apparatus which can achieve a smooth ball circulation by assembling such a ball connecting body.

Accordingly, in accordance with the invention, there is provided a ball connecting body comprising a multiplicity of balls circulating on a substantially circular ring-like ball endless track provided in a bearing apparatus; and a flexible connecting body belt arranging the balls in a line at a predetermined interval and holding each of the balls in a freely rotating manner; wherein the connecting body belt is constituted by a plurality of spacer portions inserted between the mutually adjacent balls and having a spherical seat for bringing the balls into contact therewith formed; and a flange-like connecting band portion mutually connecting the spacer portions in such a manner as to outwardly surround the spacer portions; and the connecting body belt is formed in a substantially circular ring shape at a time of arranging the balls in the connecting body belt.

Further, the ball connecting body of the invention as structured in the above manner is approximately applied to, for example, a ball screw apparatus comprising a screw shaft having a spiral ball rolling groove formed on an outer peripheral surface; a nut member having a load rolling groove opposite to the ball rolling groove of the screw shaft on an inner surface and meshed with the screw shaft through a multiplicity of balls rolling with applying a load between the ball rolling groove and the load rolling groove; a deflector fitted to the inner peripheral surface of the nut, having a ball returning groove to return a ball rolling on said load rolling groove for a wind of the load rolling groove and forming a substantially circular ring-like ball endless track on which the balls circulate in an endless manner; and which is used in such a manner as to be assembled within the ball endless track and such that the ball applies a load between the load rolling groove of the nut member and the ball rolling groove of the screw shaft.

Since the ball connecting body in accordance with the invention is formed in a substantially circular ring shape at a time of arranging the ball in the connecting body belt, it is not necessary to circulate with forcibly curbing the connecting body belt even in the case of assembling it within the substantially circular ring-like ball endless track provided in the ball screw apparatus, so that the ball connecting body can be smoothly circulated and the ball held by the connecting body belt can be smoothly circulated.

Further, since the connecting band portion of the a connecting body belt is formed in a flange shape outwardly surrounding each of the spacer portions, it can be flexibly bent in a direction perpendicular to a plane on which each of the spacer portions is arranged. Accordingly, even in the case that the ball rolling on the ball endless track is taken out from the ball rolling groove in the screw shaft through the deflector and jumps over the outer diameter portion of the screw shaft so as to move to the ball rolling groove before a lead, the connecting body belt can flexibly follow this, and can smoothly circulate in the inner portion of the ball endless track.

On the contrary, since the ball rolling on the ball endless track jumps over the outer diameter portion of the screw shaft at a time of passing through the ball returning groove formed in the deflector, it is desirable that the connecting body belt can be flexibly bent also with respect to a radial direction of the nut member so as to prevent the ball from moving in this manner. Accordingly, in view of this, it is preferable that the spherical seat formed in the spacer portions of the connecting body belt is formed in a recessed spherical surface having a curvature larger than a spherical surface of the ball so as to freely change a contact angel between each of the spacer portions and the ball.

Further, the ball connecting body in accordance with the invention can be connected in an endless manner after assembled in the ball endless track of the ball screw apparatus, however, in the case of taking an extension of the connecting body belt in a periodical use into consideration, it is preferable to use both end portions as a shape having an end in place of connecting them.

As mentioned above, since the ball connecting body in accordance with the invention can be formed in a substantially circular ring shape at a time of arranging the ball in the connecting body belt and can be flexibly bent with respect to a direction perpendicular to the plane on which each of the spacer portions is arranged, it is optimum to the ball screw apparatus in which the screw shaft and the nut member are meshed with each other through a multiplicity of balls and a substantially circular ring-like ball endless track is constructed by using the deflector, so that it can smoothly circulate therewithin at a time of being used by assembling in the ball endless track, thereby making it possible to smoothly circulate the ball and to smoothly perform a relative rotation between the screw shaft and the nut member.

BEST MODE FOR CARRYING OUT THE INVENTION

A ball connecting body in accordance with the invention will be described in detail below with reference to the accompanying drawings.

Figure 1:
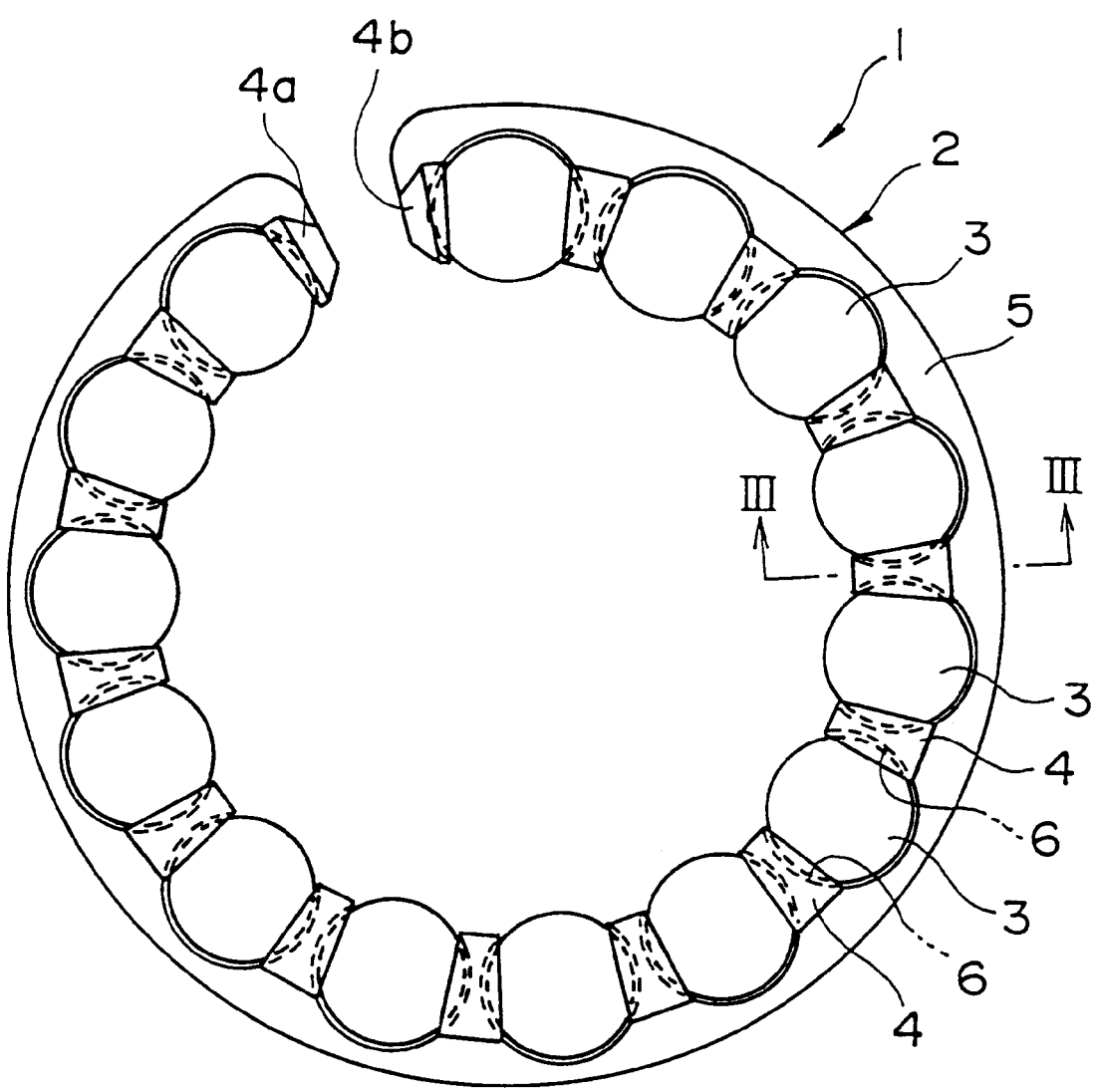
FIG. 1 is a front elevational view which shows an embodiment of a ball connecting body in accordance with the invention.
Figure 2:
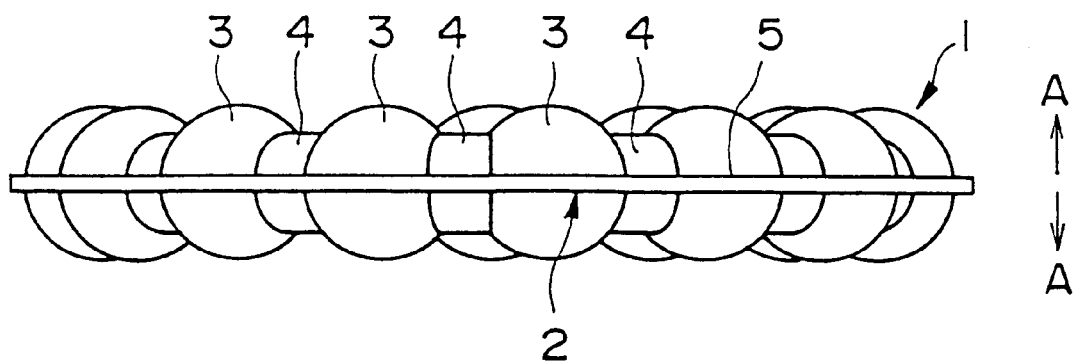
FIG. 2 is a side elevational view of a ball connecting body in accordance with an embodiment.

FIGS. 1 and 2 show a first embodiment of a ball connecting body in accordance with the invention. The ball connecting body 1 is structured such as to be formed in a substantially circular ring-like by arranging a plurality of balls 3 in a synthetic resin connecting body belt 2 in a line at a predetermined interval, and the balls 3 can be freely rotated in a state of being held in the connecting body belt 2.

The connecting body belt 2 is constituted by a plurality of spacer portions 4 interposed between the mutually adjacent balls 3 so as to prevent the balls from being in contact with each other, and a flange-like connecting band portion 5 mutually connecting the spacer portions 4 in such a manner as to outwardly surround the spacer portions 4, in this embodiment, it is formed in a substantially C shape in which a part of the circular ring is cut away. Further, each of the spacer portions 4 is formed in a thin shape at an inner diameter end of the ball connecting body 1, and on the contrary, is formed in a thick shape at an outer diameter end, thereby smoothly arranging the balls 3 in a circular ring-like manner at a time of arranging the ball 3 between the spacer portions 4.

A recessed spherical seat 6 with which the ball is brought into contact is formed in each of the spacer portions 4, and the ball 3 is held in the connecting body belt 2 by being held between a pair of spherical seats 6. Further, a curvature of the spherical seat 6 is set to be slightly larger than a curvature of a spherical surface of the ball 3, whereby a contact angle between the ball 3 and the spherical seat 6 can be freely changed at a certain degree. As a result, the ball connecting body 1 can be freely deformed at a certain degree with respect to a radial direction thereof.

Figure 3:
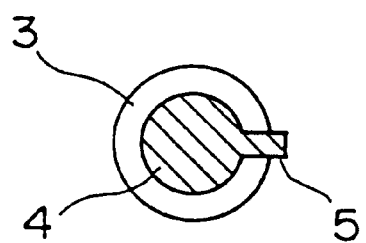
FIG. 3 is a cross sectional view along a line III—III in FIG. 1.

As shown in FIGS. 2 and 3, the connecting band portion 5 is formed in such a manner as to project outside the ball row arranged in a circular ring manner, as a result, the ball connecting body 1 can be freely bent to a direction (a direction shown by an arrow A in FIG. 2) perpendicular to the plane on which the balls 3 are arranged.

Further, spacer portions 4a and 4b positioned at both ends of the connecting body belt 2 are formed in a steeple manner, and on the contrary, a front end of the connecting band portion 5 connected to these spacer portions 4a and 4b is also formed in a circular arc shape, thereby preventing the front end of the connecting body belt 2 from generating a hook portion within the ball endless track at a time when the ball connecting body 1 circulates the ball endless track of the ball screw apparatus.

The connecting body belt 2 is manufactured by an injection molding of a synthetic resin. In such an injection molding, a plurality of dummy balls having a diameter slightly larger than the ball 3 to be arranged in the connecting body belt 2 are inserted into a molding metal mold as a core, and they are arranged within the metal mold in the same manner as the arranging state of the ball 3 with respect to the connecting body belt 2. Then, the connecting body belt 2 holding the dummy ball between the spacer portions 4 is formed by injecting the synthetic resin into the metal mold from this state. After the formed connecting body belt 2 is taken out from the metal mold, the dummy ball is removed, and in place of this, the ball 3 is inserted between the spacer portions 4, so that the ball connecting body 1 in accordance with this embodiment is completed.

As mentioned above, when the connecting body belt 2 is formed by using the dummy ball having a diameter larger than the ball 3 as a core, the spherical seat 6 of each of the spacer portions 4 is formed in a recessed spherical surface following the spherical surface of the dummy ball, so that the spherical seat 6 having a curvature larger than a curvature of the spherical surface of the ball 3 can be easily formed. Further, since the ball 3 finally arranged, in the connecting body belt 2 has a diameter smaller than the dummy ball, a significantly small gap is formed between the spacer portions 4 and the ball 3, so that it is possible to secure a free rotation of the ball with respect to the spacer portions 4.

On the contrary, it is possible to form the connecting body belt 2 holding the ball 3 between the spacer portions 4 by inserting the ball 3 within the forming metal mold as a core without using the dummy ball, and in accordance with this method, a replacing operation between the dummy ball and the ball 3 is not required, so that the ball connecting body 1 can be further easily manufactured. In this case, since the ball 3 and the spacer portions 4 of the connecting body belt 2 are in close contact with each other, the ball connecting body 1 taken out from the metal mold is immersed into a mineral oil type lubricating oil as it is and the synthetic resin connecting body belt 2 is swelled by the lubricating oil. Accordingly, the spherical seat 6 of each of the spacer portions 4 becomes a recessed spherical surface having a curvature larger than a curvature of the spherical surface of the ball 3, a gap is formed between the ball 3 and the spacer portions 4, and it is also possible to secure a free rotation of the ball 3 with respect to the spacer portions 4.

Figure 4:
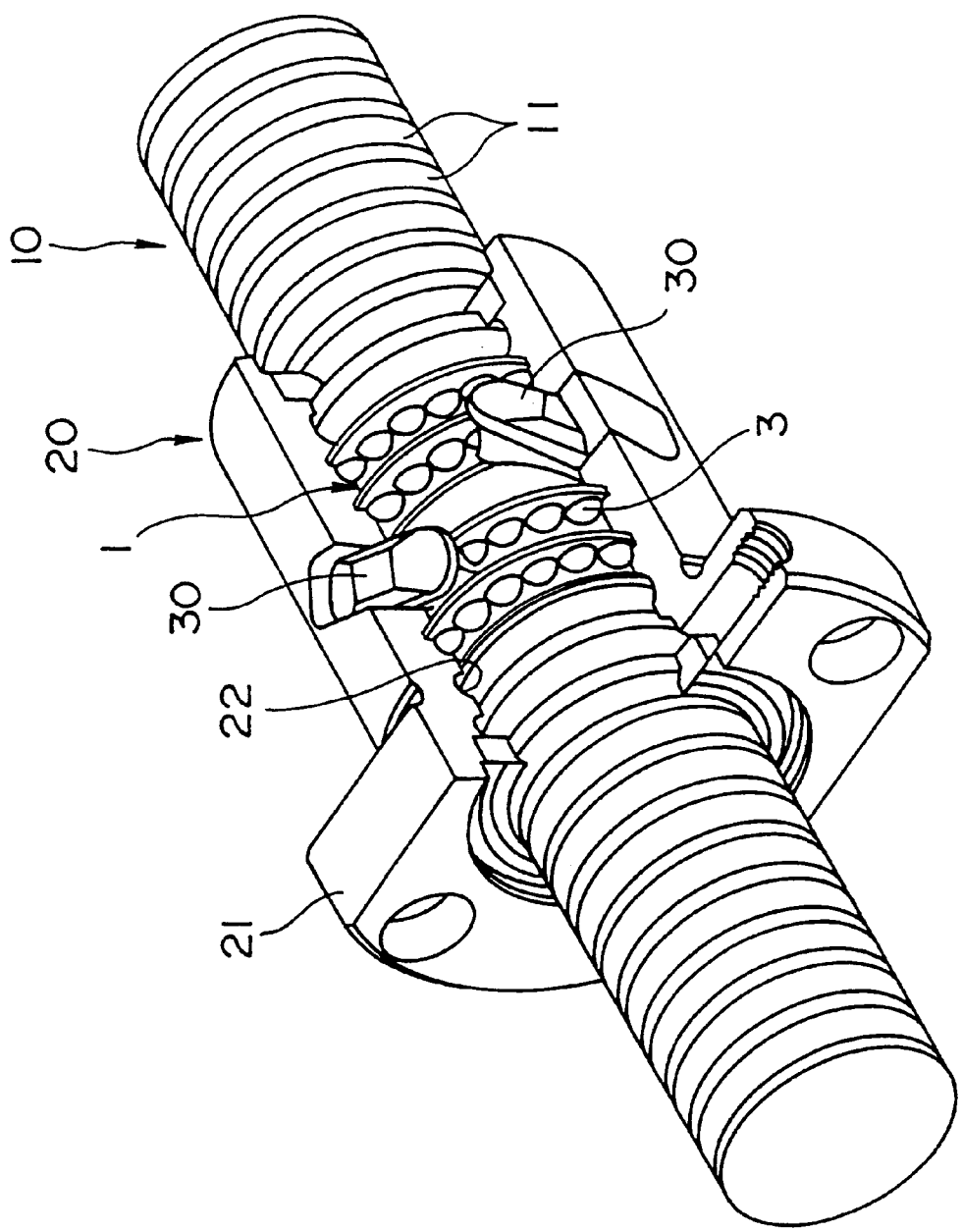
FIG. 4 is a partly cut-away perspective view showing an embodiment of a ball screw apparatus in which a ball connecting body shown in FIG. 1 is assembled.
Figure 5:
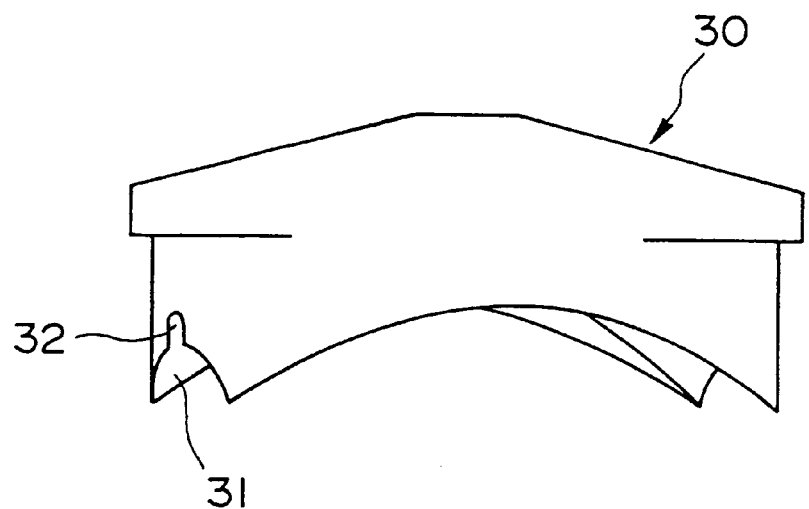
FIG. 5 is a front elevational view which shows a deflector in accordance with a ball screw apparatus of an embodiment.
Figure 6:
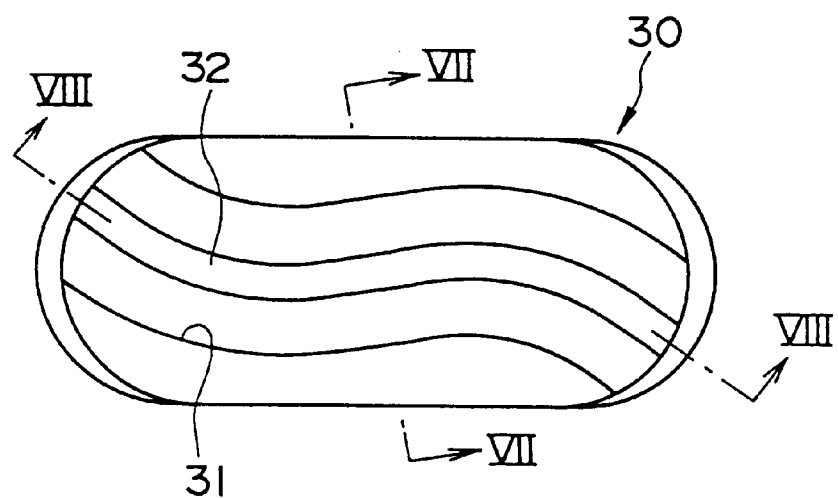
FIG. 6 is a bottom elevational view which shows a deflector in accordance with a ball screw apparatus of an embodiment.
Figure 7:
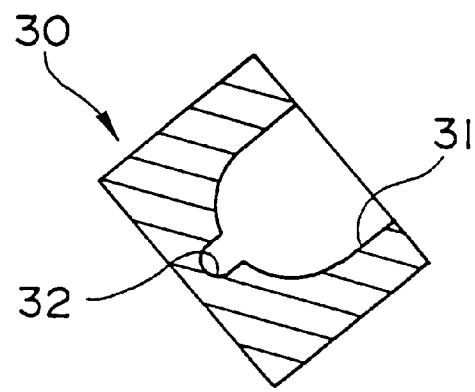
FIG. 7 is a cross sectional view along a line VII—VII in FIG. 6.
Figure 8:
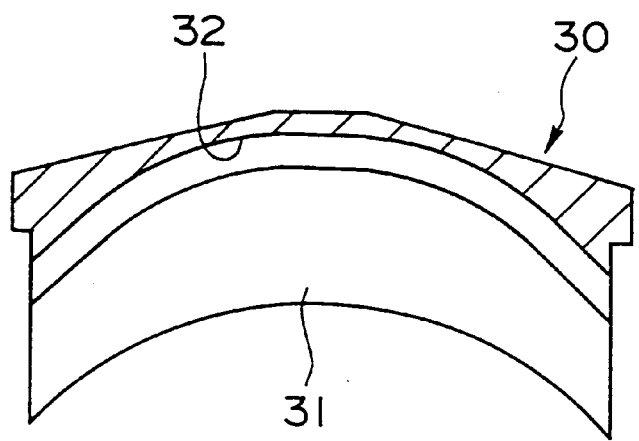
FIG. 8 is a cross sectional view along a line VIII—VIII in FIG. 6.

FIG. 4 shows an embodiment of the ball screw apparatus in which the ball connecting body 1 is assembled.

In the drawing, reference numeral 10 denotes a screw shaft on which a spiral ball rolling groove 11 is formed at a predetermined lead, and reference numeral 20 denotes a nut member having an endless track in which the ball connecting body 1 mentioned above is assembled and being meshed with the screw shaft 10 through the ball 3, and the structure is made such that the nut member 20 moves in an axial direction of the screw shaft 10 by a relative rotation between the screw shaft 10 and the nut member 20.

The nut member 20 mentioned above is formed in a cylindrical shape through which the screw shaft 10 extends, and a flange portion 21 for fixing the nut member 20 to a movable body such as a table is provided on an outer peripheral surface thereof in a projecting manner. Further, a spiral load rolling groove 22 opposing to the ball rolling groove 11 of the screw shaft 10 is formed on an inner peripheral surface of the nut member 20, so that the ball 3 rolls between the ball rolling groove 11 and the load rolling groove 22 with applying the load. The load rolling groove 22 is formed in a so-called Gothic arch shape in which two ball rolling surfaces are crossed, and an escape groove for receiving the connecting band portion 5 of the ball connecting body 1 mentioned above is formed at a deepest portion of the groove.

On the contrary, a deflector 30 for circulating the ball 3 between the screw shaft 10 and the nut member 20 in an endless manner is fitted on the inner peripheral surface of the nut member 20. As shown in FIG. 4, the deflector 30 is fixed to the nut member 20 in such a manner as to jump over the ball rolling groove 11 of the screw shaft 10 for only a wind, so that the ball 3 rolling on the ball rolling groove 11 of the screw shaft 10 is changed a progressing direction thereof by the deflector 30 and returned to the ball rolling groove 11 a wind before by jumping over the outer diameter of the screw shaft 10, whereby it is structured such that the ball 3 circulates within the nut member 20 in an endless manner. Further, in the nut member 20 in accordance with this embodiment, four deflectors 30 are fixed in such a manner as to uniformly separate the circumference of the nut member 20 into four portions, so that all four endless tracks are formed on the ball 3. Accordingly, four ball connecting bodies 1 are assembled in the nut member 20 mentioned above.

FIGS. 5 to 8 show a detailed structure of the deflector 30 mentioned above.

A substantially S-shaped ball returning groove 31 is formed on the deflector 30, and a guide groove 32 for guiding the connecting band portion 5 of the ball connecting body 1 is formed in a center portion of the ball returning groove 31. Further, the ball returning groove 31 is formed in a most recessed shape at a center position of the deflector 30 so that the ball 3 entering to the ball returning groove 31 can jump over the outer diameter of the screw shaft 10.

In accordance with the ball screw apparatus of this embodiment structured in the above manner, when the screw shaft 10 and the nut member 20 are relatively rotated, the ball 3 assembled in the ball connecting body 1 rolls on the load rolling groove 22 of the nut member 20 and the ball rolling groove 11 of the screw shaft 10, and the ball connecting body 1 circulates in the inner portion of the endless track formed on the nut member 20.

Figure 9:
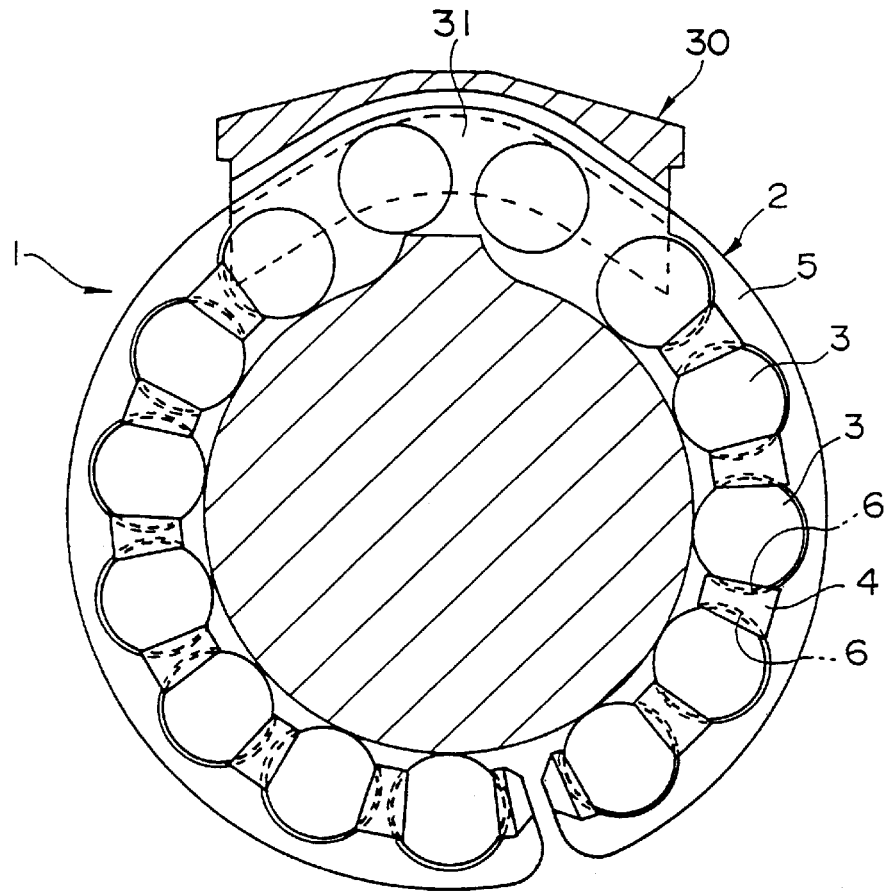
FIG. 9 is a front cross sectional view showing a state in which a ball connecting body of an embodiment circulates on a ball endless track of a ball screw apparatus.
Figure 10:
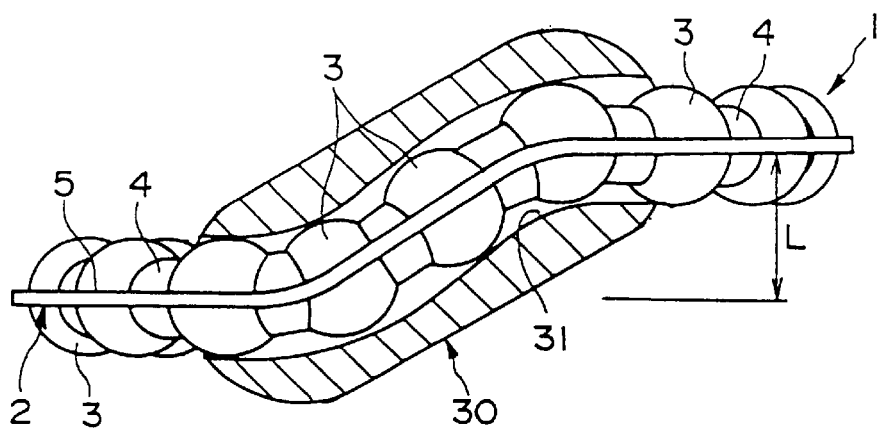
FIG. 10 is a plan view showing a state in which a ball connecting body of an embodiment circulates on a ball endless track of a ball screw apparatus.
Figure 11:
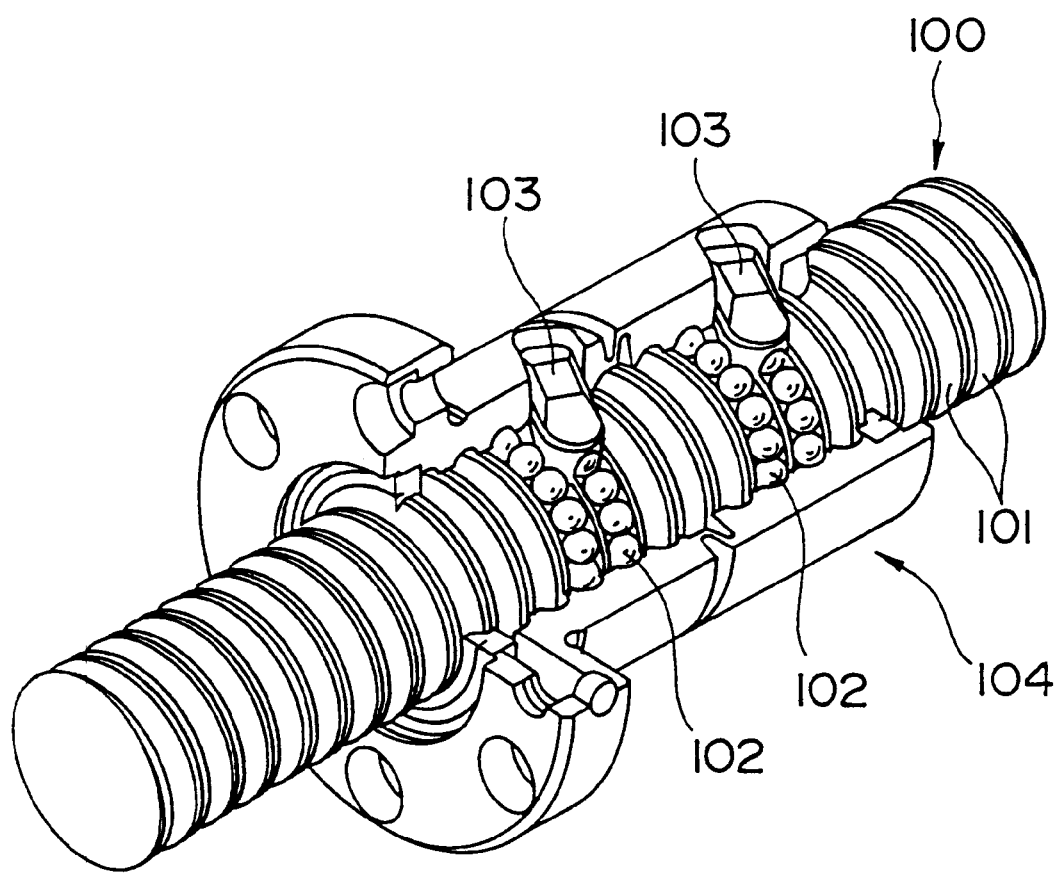
FIG. 11 is a partly cut-away perspective view which shows a conventional ball screw apparatus.

FIGS. 9 and 10 show a state in which the ball connecting body 1 in accordance with this embodiment circulates in the inner portion of the ball endless track. The ball endless track is formed in a substantially circular ring shape surrounding a periphery of the screw shaft 10, however, is expanded outward in a radial direction of the screw shaft 10 at a position where the deflector 30 is mounted. Accordingly, the ball connecting body 1 is expanded toward an outer side in a radial direction of the endless track at a time of passing through the ball returning groove 31 of the deflector 30, and is come out from the ball rolling groove 11 of the screw shaft 10 so as to jump over the outer diameter portion of the screw shaft 10, on the contrary, goes along the ball returning groove 31 in a zigzag manner and moves along the axial direction of the screw shaft 10 for a lead of the ball rolling groove 11 (for a distance L in FIG. 10). Therefore, the ball 3 jumps over the outer diameter of the screw shaft 10 together with the connecting body belt 2 so as to be returned to the ball rolling groove 11 a wind before, and circulates on the periphery of the screw shaft 10 in an endless manner.

At this time, since the ball connecting body 1 in accordance with this embodiment is formed in a substantially circular ring shape in a state of arranging the ball 3 on the connecting body belt 2, a unreasonable force intending to forcibly bend it against the connecting body belt 2 does not act even when it is assembled within the ball endless track also formed in a substantially circular ring shape, so that it is possible to smoothly circulate within the ball endless track.

Further, in the connecting body belt 2, the connecting band portion 5 is formed in a flange shape outwardly surrounding each of the spacer portions 4, and is softly bent with respect to a direction shown by an arrow A (refer to FIG. 2) perpendicular to the plane on which the balls 3 are arranged, so that even in the case of being guided in the inner portion of the deflector 30 in an S-shaped manner as shown in FIG. 10, it can smoothly pass through the inner portion of the ball returning groove 31 in the deflector 30. Accordingly, also in this point, the ball connecting body 1 in accordance with this embodiment can smoothly circulate in the inner portion of the ball endless track.

In addition, since the spherical seat 6 formed in each of the spacer portions 4 of the connecting body belt 2 is formed in a recessed spherical surface having a curvature larger than the spherical surface of the ball 3, a slight gap is formed between the spherical seat 6 and the ball 3, and both can freely change a contact angle thereof at a certain degree. Accordingly, as shown in FIG. 9, even in the case that only a part of the peripheral direction of the ball connecting body 1 expands outward in a radial direction at a position of arranging the deflector 30, no external force intending to forcibly bend this against the ball connecting body 1 acts, so that the ball connecting body 1 can be smoothly circulated within the ball endless track.

Accordingly, in the case of using the ball connecting body 1 in accordance with this embodiment in a state of being assembled in the ball endless track of the ball screw apparatus shown in FIG. 4, the ball connecting body 1 can significantly smoothly circulate within the ball endless track, so that a relative rotation between the screw shaft 10 and the nut member 20 can be smoothly performed.

What is claimed is:

1. A ball connecting body comprising:

a multiplicity of balls circulating on a substantially circular ring-like ball endless track provided in a bearing apparatus; and a flexible connecting body belt arranging the balls in a line at a predetermined interval and holding each of the balls in a freely rotating manner; wherein said connecting body belt is constituted by a plurality of spacer portions inserted between mutually adjacent balls and having a spherical seat for bringing the balls into contact therewith, and a flange-like connecting band portion mutually connecting on only one side of the spacer portions; and said connecting body belt is formed in a substantially circular ring shape at a time of arranging the balls in the connecting body belt so as to radially outwardly surround the spacer portions and the balls.

2. A ball connecting body as recited in claim 1, wherein said connecting body belt is formed so as to have an end, and a length thereof is substantially equal to a length of a periphery of said ball endless track.

3. A ball screw apparatus comprising:

a screw shaft having a spiral ball rolling groove formed on an outer peripheral surface;

a nut member having a load rolling groove opposite to the ball rolling groove of the screw shaft on an inner surface and meshed with said screw shaft through a multiplicity of balls rolling with applying a load between the ball rolling groove and the load rolling groove;

a deflector fitted to an inner peripheral surface of the nut, having a ball returning groove to return a ball rolling on said load rolling groove for a wind of the load rolling groove and forming a substantially circular ring-like ball endless track on which the balls circulate in an endless manner; and wherein a ball connecting body is assembled within said ball endless track, said ball connecting body comprising a ball connecting body comprising:

a multiplicity of balls circulating on a substantially circular ring-like ball endless track provided in a bearing apparatus; and a flexible connecting body belt arranging the balls in a line at a predetermined interval and holding each of the balls in a freely rotating manner; wherein said connecting body belt is constituted by a plurality of spacer portions inserted between mutually adjacent balls and having a spherical seat for bringing the balls into contact therewith and a flange-like connecting band portion mutually connecting on only one side of the spacer portions; and said connecting body belt is formed in a substantially circular ring shape at a time of arranging the balls in the connecting body belt so as to radially outwardly surround the spacer portions and the balls, and said ball is structured such as to apply a load between the load rolling groove of the nut member and the ball rolling groove of the screw shaft.

* * * * *